US012692071B2

(12) United States Patent
Orth et al.

(10) Patent No.: US 12,692,071 B2
(45) Date of Patent: Jul. 28, 2026

(54) DELIVERY VEHICLE AND METHOD FOR DELIVERY OF CONSIGNMENTS TO DIFFERENT SITES ALONG A DELIVERY ROUTE

(71) Applicants: Felix Orth, Aachen (DE); Fabian Schmitt, Eynatten (BE); Martin Sommer, Aachen (DE); Uwe Kessels, Eschweiler (DE)

(72) Inventors: Felix Orth, Aachen (DE); Fabian Schmitt, Eynatten (BE); Martin Sommer, Aachen (DE); Uwe Kessels, Eschweiler (DE)

(73) Assignee: StreetScooter GmbH, Aachen (DE)

( * ) Notice: Subject to any disclaimer, the term of this patent is extended or adjusted under 35 U.S.C. 154(b) by 0 days.

(21) Appl. No.: 15/481,617

(22) Filed: Apr. 7, 2017

(65) Prior Publication Data

US 2017/0291766 A1 Oct. 12, 2017

(30) Foreign Application Priority Data

Apr. 8, 2016 (DE) ..................... 10 2016 106 456.4

(51) Int. Cl.
  B65G 1/04 (2006.01)
  B60P 3/00 (2006.01)
  (Continued)

(52) U.S. Cl.
  CPC ............ B65G 1/0485 (2013.01); B60P 3/007 (2013.01); B65G 1/1378 (2013.01); G06Q 10/08 (2013.01);
  (Continued)

(58) Field of Classification Search
  CPC ....... G06Q 10/08; G06Q 10/0832; B60P 1/36; B60P 3/205; G07F 11/007; G07F 11/58; G07F 11/60; A47F 3/08; B65G 1/1378
  See application file for complete search history.

(56) References Cited

U.S. PATENT DOCUMENTS 1,970,955 A     8/1934 Ehrlich
3,369,684 A *   2/1968 Ford ........................ B60P 1/64
                                                       414/498

(Continued)

FOREIGN PATENT DOCUMENTS

CN        104169196 A    11/2014
DE        2 310 157 A1    9/1974

(Continued)

*Primary Examiner* — Gene O Crawford
*Assistant Examiner* — Kelvin L Randall, Jr.
(74) *Attorney, Agent, or Firm* — Reinhart Boerner Van Deuren P.C.

(57) ABSTRACT

Delivery vehicle is described and depicted which serves for delivery, in particular autonomously, of consignments to different sites along a delivery route, with a loading space comprising a shelf system for shelves containing consignments. In order to save time and cost for delivery or hand-over of consignments along a delivery route, it is provided that the shelf system is configured to receive shelves in a plurality of storage positions for provision of the shelves and in at least one extraction position for extraction of consignments from the shelves, and that the shelf system has at least one adjustment device for adjusting, in particular moving, the shelves of the shelf system between several storage positions and the at least one extraction position.

14 Claims, 11 Drawing Sheets

(51) Int. Cl.

| | |
|---|---|
| *B65G 1/137* | (2006.01) |
| *G06Q 10/08* | (2024.01) |
| *G06Q 10/083* | (2023.01) |
| *G06Q 10/0832* | (2023.01) |
| *G06Q 10/0835* | (2023.01) |

(52) U.S. Cl.
CPC ..... *G06Q 10/0832* (2013.01); *G06Q 10/0835* (2013.01); *G06Q 10/08355* (2013.01)

(56) References Cited

U.S. PATENT DOCUMENTS

| | | | | |
|---|---|---|---|---|
| 3,800,963 | A * | 4/1974 | Holland | B65G 1/0414 |
| | | | | 191/12.2 R |
| 3,999,671 | A | 12/1976 | Lutz | |
| 4,009,792 | A * | 3/1977 | Sano | B60P 1/52 |
| | | | | 414/512 |
| 4,830,421 | A * | 5/1989 | Hawelka | A62C 27/00 |
| | | | | 296/24.45 |
| 5,125,782 | A * | 6/1992 | Goldschmidt | B65G 1/06 |
| | | | | 198/347.1 |
| 5,344,270 | A * | 9/1994 | Leung | B65G 1/0464 |
| | | | | 414/234 |
| 5,547,329 | A * | 8/1996 | Hirai | C12M 23/48 |
| | | | | 198/347.1 |
| 5,680,942 | A * | 10/1997 | McAllister | A47F 5/0093 |
| | | | | 16/35 R |
| 6,027,190 | A * | 2/2000 | Stewart | A47B 53/00 |
| | | | | 312/201 |
| 7,381,022 | B1 * | 6/2008 | King | B65G 1/0492 |
| | | | | 187/270 |
| 8,025,165 | B2 * | 9/2011 | Dressendorfer | B65G 1/0478 |
| | | | | 211/191 |
| 8,303,233 | B2 * | 11/2012 | Solomon | A47B 63/067 |
| | | | | 104/130.07 |
| 8,628,289 | B1 * | 1/2014 | Benedict | B65G 1/0478 |
| | | | | 414/234 |
| 9,020,632 | B2 * | 4/2015 | Naylor | B65G 1/065 |
| | | | | 414/273 |
| 9,598,238 | B2 * | 3/2017 | Kadaba | B65G 67/04 |
| 9,630,545 | B1 * | 4/2017 | Corrigan | B60P 1/38 |
| 9,718,564 | B1 * | 8/2017 | Beckman | G06Q 10/0832 |
| 9,963,061 | B2 * | 5/2018 | Blatstein | B60P 1/36 |
| 2003/0042269 | A1 * | 3/2003 | Blong | G07F 7/0609 |
| | | | | 221/93 |
| 2004/0149672 | A1 * | 8/2004 | Motoori | B65G 37/02 |
| | | | | 212/332 |
| 2008/0247279 | A1 * | 10/2008 | Pickett | G11B 15/6835 |
| | | | | 221/87 |
| 2011/0215109 | A1 * | 9/2011 | Bailey | B65D 83/00 |
| | | | | 221/1 |
| 2012/0177467 | A1 * | 7/2012 | Corrigan | B60P 1/38 |
| | | | | 414/352 |
| 2012/0298688 | A1 | 11/2012 | Stiernagle | |
| 2012/0323474 | A1 * | 12/2012 | Breed | B60W 30/04 |
| | | | | 701/117 |
| 2014/0058554 | A1 * | 2/2014 | Janet | B65G 49/00 |
| | | | | 700/214 |
| 2014/0229000 | A1 * | 8/2014 | Hoshino | B65G 1/1378 |
| | | | | 700/215 |
| 2016/0031356 | A1 * | 2/2016 | Blatstein | B60P 1/36 |
| | | | | 296/24.36 |
| 2017/0100749 | A1 * | 4/2017 | Hartmann | G06K 7/10792 |
| 2017/0107056 | A1 * | 4/2017 | Kadaba | B65G 67/04 |
| 2017/0166406 | A1 * | 6/2017 | Horii | B65G 43/00 |
| 2017/0190054 | A1 * | 7/2017 | McCollum | B25J 15/0014 |
| 2017/0225602 | A1 * | 8/2017 | Corrigan | B60P 1/38 |
| 2017/0286908 | A1 * | 10/2017 | Lively | G06F 17/30312 |
| 2017/0305669 | A1 * | 10/2017 | Tsai | B65G 1/137 |
| 2017/0357919 | A1 * | 12/2017 | Bischoff | B07C 3/08 |
| 2018/0065807 | A1 * | 3/2018 | Lert, Jr. | B65G 1/0492 |
| 2018/0127212 | A1 * | 5/2018 | Jarvis | B65G 1/0435 |
| 2018/0222374 | A1 * | 8/2018 | Blatstein | B60P 1/36 |
| 2019/0152702 | A1 * | 5/2019 | Testa | G07F 17/12 |

FOREIGN PATENT DOCUMENTS

| | | | |
|---|---|---|---|
| DE | 198 09 291 | A1 | 9/1999 |
| DE | 10 2006 025 876 | A1 | 12/2007 |
| FR | 2 983 441 | A1 | 6/2013 |
| NL | 1 015 889 | C2 | 2/2002 |

* cited by examiner

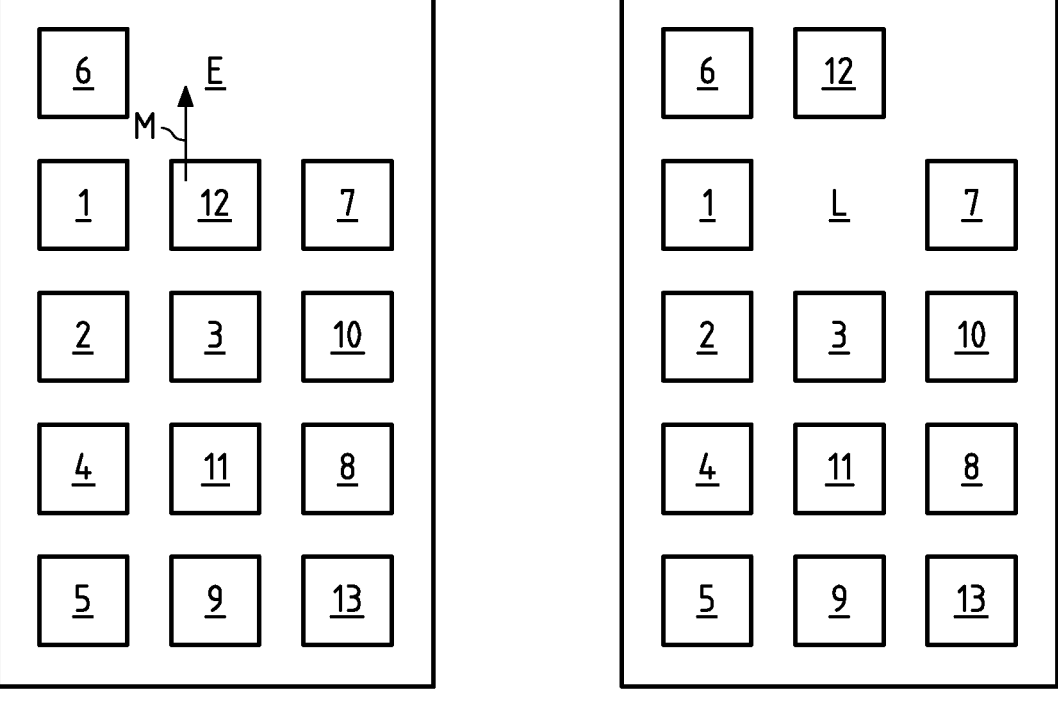
Fig.2F                 Fig.2G

DELIVERY VEHICLE AND METHOD FOR DELIVERY OF CONSIGNMENTS TO DIFFERENT SITES ALONG A DELIVERY ROUTE

CROSS-REFERENCE TO RELATED PATENT APPLICATION

This patent application claims priority to German Application No. 10 2016 106 456.4, filed Apr. 8, 2016, the entire teachings and disclosure of which are incorporated herein by reference thereto.

FIELD OF THE INVENTION

The invention concerns a delivery vehicle for delivery of consignments to different sites along a delivery route, with a loading space comprising a shelf system for shelves containing consignments. The invention also concerns a method for delivering consignments to different sites along a delivery route with a corresponding delivery vehicle.

BACKGROUND OF THE INVENTION

Various delivery vehicles are used for delivering consignments to different sites along a delivery route. The nature of the delivery vehicles here depends on the nature of the consignments which must be delivered or handed over along the delivery route. The delivery route usually leads over the public road network. It is preferably not so-called works traffic, i.e. goods transport within a plant and/or company. For this, typically very special delivery vehicles are used which are not suitable for transport over longer distances and normally also not for widely varying consignments.

In the present case, the consignments are in principle different objects which can preferably be transported with a clear cost. In particular, the consignments may be present as piece goods. These include objects of daily use such as consumables or foodstuffs, together with technical objects and devices. In many cases, the consignments are consignments of a postal company which could be described as postal consignments. In some cases, the consignments are mail consignments, parcel consignments and/or flyers. Parcel consignments also include small packets, while flyers may be leaflets, brochures and magazines. Also, a mail consignment may be not only a letter but also a postcard. Parcel consignments and other consignments in many cases are repacked goods, wherein then the consignment includes the packing and the product packed therein. When some of these consignments, in particular consignments of a postal company, parcel consignments, mail consignments and/or flyers, are handed over at their destination, for example at the destination address or to the addressee, this is usually described as delivery of the consignment. Other consignments are described as presented, handed over or unloaded. The distinction in the present case is of secondary importance, in particular as the boundaries between delivery, hand-over, unloading or presentation—where they actually exist—cannot be drawn precisely, and for the present invention, a precise border or distinction is not relevant or of only secondary importance.

When the consignments are not too large, such as for example is the case with parcel consignments, the consignments may be stowed in a shelf system of a loading space of the delivery vehicle. Along the delivery route, the consignments are extracted from the shelves of the shelf system and delivered or handed over. Usually, the shelves are provided on both sides of the delivery vehicle and are separated from each other by a central aisle, so that the driver of the delivery vehicle can take the consignments from the shelves. In the case of autonomous delivery vehicles in which delivery takes place autonomously, i.e. without human intervention, and in some cases the delivery route may also be driven autonomously, i.e. without human intervention, the central aisle of the loading space between the shelves arranged on the sides is used for example for a robot or another transport system which extracts the consignments from the shelves for the purpose of delivery.

The space provided for receiving consignments is in principle limited. This is due in particular to the size of the available loading space of the delivery vehicle, and also to the space required for manual or mechanical loading and unloading of the shelf system. Therefore as necessary, the size of the loading space, the size of the consignments and the length of the delivery routes are matched to each other. Often, a delivery vehicle must still drive successively over several delivery routes in order to be able to deliver or hand over all consignments. After each trip, the delivery vehicle must return to the distribution centre or a store for consignments, for example a warehouse, in order to receive further consignments there and stow these in the shelf system. Returning to the distribution centre or store, together with repeated loading of the delivery vehicle, is associated with increased time consumption and consequently increased cost. The consignments are namely typically loaded individually by hand and in an arrangement and/or order which takes into account the next delivery route to be driven, so the consignments can be unloaded more easily and reliably along the delivery route.

BRIEF SUMMARY OF SOME EXEMPLARY EMBODIMENTS OF THE INVENTION

The invention is based on the object of configuring and refining the delivery vehicle and the method of the types cited initially and described above, such that time and costs for delivery or hand-over of consignments along a delivery route can be saved.

This object is achieved with a delivery vehicle according to the preamble of claim 1 in that the shelf system is configured to receive shelves in a plurality of storage positions for provision of the shelves and in at least one extraction position for extraction of consignments from the shelves, and that the shelf system has at least one adjustment device for adjusting, in particular moving, the shelves of the shelf system between several storage positions and the at least one extraction position.

Said object is also achieved according to claim 10 by a method for delivering consignments to different sites along a delivery route with a delivery vehicle preferably according to any of claims 1 to 9, with a loading space comprising a shelf system with shelves for receiving consignments in a plurality of storage positions and at least one extraction position, in which the shelf with the next consignment to be delivered is adjusted, in particular moved, via an adjustment device from a storage position into the extraction position, and in which other shelves of the shelf system are adjusted such that the other shelves, for adjustment of the one shelf into the extraction position, clear at least one storage position and preferably the extraction position, in particular in stages.

The invention has thus found that the loading space available in the delivery vehicle can be used more efficiently by the adjustable shelves without disproportionately hindering the loading with consignments and the delivery or hand-over of consignments. This is based on the concept of not mounting the shelves of a delivery vehicle stationarily, as has been the case previously, but receiving the shelves adjustably in a shelf system in the loading space of the delivery vehicle. The adjustability of the shelves allows a greater proportion of the loading space to be provided with shelves, since not all shelves need be accessible simultaneously. The shelves to which access is desired may nonetheless be adjusted into at least one extraction position in which the shelves are accessible. Thus there is always unobstructed access to each shelf, just not simultaneously but only after corresponding adjustment of the shelves in the shelf system. In order to be able to output a consignment from a shelf easily, the shelf is accordingly first adjusted from one of several storage positions which serve for space-saving provision of the shelves, into an extraction position in which the consignment can be extracted from the shelf manually or by means of an extraction device. In order to be able to achieve such an adjustment of the shelf from a storage position into the extraction position and back, an adjustment device is provided for the shelf system. The adjustment device however also allows adjustment of shelves from one storage position to another storage position.

The adjustment device is therefore in particular a device which allows adjustment as a whole. The adjustment device may comprise further devices which are indeed necessary but not sufficient for adjusting the shelves. The adjustment device may thus in principle be configured in widely varying ways, for which reason the term "adjustment device" in this case may be understood as a general term for the components necessary for adjusting the shelves, and if necessary also for components which are optional for adjusting shelves.

According to the method, for example a storage position may be cleared in order to move the shelf with the next consignment to be extracted into the storage position. The shelf may be moved from the storage position either directly into the extraction position or firstly into another storage position. This storage position in turn may first be cleared by adjustment of other shelves. Movement of the shelf carrying the next consignment to be extracted into the extraction position may therefore if necessary take place in stages via several storage positions, wherein if necessary further shelves may have to be adjusted several times in order to clear the respective storage position or storage positions. Preferably, such as when the extraction position is already occupied by a further shelf, the at least one further shelf, where applicable also other further shelves, may be adjusted in order to clear the extraction position for the shelf with the next consignment to be extracted. In a particularly simple case, the next consignment to be received is already provided in a shelf which is already situated in the at least one extraction position. Adjustment of shelves before extraction of the corresponding consignment may then be omitted. In principle, better utilisation of the loading space is achieved at the cost of the complexity of adjustment of the shelves. This complexity is however justified as a whole.

In the shelf system of the type described, the shelves may preferably be arranged and moved in the sense of a shift puzzle. A shift puzzle frequently consists of 15 similar puzzle pieces which are arranged on 16 fields of a grid. The grid has edge lengths which correspond to the length or width of 4 puzzle pieces. One field thus remains free, forming a "hole" or empty space in the puzzle. An adjacent puzzle piece may be moved onto the free field or empty space by movement in the longitudinal or transverse direction relative to the grid. The aim typically consists of bringing the puzzle pieces into a specific order by movement of the puzzle pieces within the grid, such as bringing the puzzle pieces marked with digits from 1 to 15 into an incremental order. For this, the puzzle pieces are configured square with equal edge lengths. By suitable movement of puzzle pieces and filling of the empty space without a puzzle piece in the grid, an empty space is formed at another site in the grid which can then be used for moving at least one other puzzle piece. Thus step-by-step, at least one puzzle piece can be moved into the desired position in the grid. The principle of the shift puzzle is not however restricted to the use of a 4×4 grid, to the use of 15 puzzle pieces and/or square puzzle pieces. The same also applies to the shelf system or method for moving the shelves. In particular, there may be more than one empty position in the shelf system. Thus it may be ensured that each shelf can be adjusted easily into the at least one extraction position. However, this may also contribute to a shortening of the cycle time, i.e. the time required to adjust a specific shelf of the shelf system into the at least one extraction position. In principle, more space is available for adjusting the shelves, the more empty positions or unoccupied storage positions are present in the shelf system.

In principle, one extraction position is sufficient, from which all consignments in succession can be extracted from the shelves. If necessary however, more extraction positions may be provided. The extraction positions may here be provided at different sites of the loading space, for example in order to be able to extract consignments easily from shelves on both sides of the loading space and/or at its rear. Then it is useful if the extraction positions are spaced by storage positions, in order to be able to utilise better the loading space available. In order to be able to extract very many consignments simultaneously or within a short time, several extraction positions may also be arranged next to each other. Then there is no need to move several shelves successively into an extraction position in order to extract the desired consignments from the shelf system.

Adjustment may take place in a simple and hence preferred fashion by moving the shelves. The shelves may then for example stand on the loading floor of the loading space and need not be held completely by the shelf system. In order nonetheless to be able to be moved easily, the shelves may have rollers or castors. Movement is however in principle easy to achieve because the shelves then preferably need only be moved in one plane.

For better understanding and to avoid unnecessary repetition, preferred embodiments of the delivery vehicle and method for delivery of consignments are described together below, without distinguishing in each case between the delivery vehicle and the method. For the person skilled in the art however, it is evident from the context which features are preferred for the delivery vehicle and for the method respectively.

In a first, particularly preferred embodiment of the delivery vehicle, the storage positions of the shelf system are arranged in rows running parallel and perpendicular to each other. These rows may then as necessary run in the longitudinal direction of the delivery vehicle and transversely thereto. This allows firstly good utilisation of the loading space of the delivery vehicle, and secondly easy adjustment of the shelves. The shelves then for example need be moved only in two directions in order to move the shelf with the next consignment to be extracted into the extraction position. These two directions are then the directions, in particular crossed, of the rows of storage positions or shelves which extend preferably in the longitudinal direction of the delivery vehicle and transversely thereto. The corresponding rows, in particular the rows arranged in the transverse direction of the delivery vehicle, of storage positions or shelves may if required be very short and only comprise two storage positions or shelves. Longer rows are however also possible.

In order for the shelves to be adjustable in the desired fashion, the sum of the storage positions and extraction positions should be greater than the number of shelves of the shelf system. Depending on the arrangement of storage positions and extraction positions, one free storage position or extraction position may suffice. In some cases however, at least two positions must remain free, wherein the corresponding positions may be storage positions and/or extraction positions, depending on the arrangement of the shelves in the shelf system. If only a small number of consignments must be carried on the delivery route, and at the same time no or only a few consignments taken into the shelf system along the delivery route, it is suitable to leave a greater number of storage positions and/or extraction positions free in order to simplify the adjustment of the existing shelves and accelerate the cycle times. With the preferred embodiment of the shelf system with a single extraction position, therefore, at most the same number of shelves may be provided as storage positions. Fewer shelves are indeed possible but lead to less optimal utilisation of the loading space of the delivery vehicle.

The adjustment of the shelves and the handling of the shelf system is simplified if the shelves of the shelf system are configured at least substantially the same. Thus a distinction is made not with regard to the shelves, but as required only with regard to the consignments received therein. Also, shelves with the same outer form and/or design may also be adjusted similarly, in particular moved, which leads to a further simplification, in particular of the method.

In order to be able to use the shelves as flexibly as possible, wherein the shelves for example need not be loaded with consignments as a function of the order of delivery or hand-over of consignments, it is suitable if the adjustment device allows at least one shelf to be adjusted into each storage position of the shelf system. Said advantage becomes more applicable, the more shelves are adjustable in this way. It is thus particularly preferred if each shelf of the shelf system may be adjusted, in particular moved, by means of the adjustment device optionally into each of the storage positions. Irrespective of this, the shelves used may be utilised particularly suitably if the shelves, in particular each of the shelves, of the shelf system can be adjusted into the at least one extraction position. If several extraction positions are provided, it is preferred if the shelves, in particular all shelves, can be adjusted at least into one extraction position, or in particular into all extraction positions for reasons of greater flexibility.

The adjustment of the shelves of the shelf system is simplified for example if the adjustment device has a guide device, preferably comprising a rail system, for guiding the shelves in the shelf system between several storage positions and the extraction position. The shelves are thus guided in and/or along the guide devices or corresponding rail system. Thus the degrees of freedom in adjustment of the shelves are clearly predefined. As required, the shelves may also be guided by means of rollers, in particular by corresponding carriages, on or in the guide device, which reduces the force required for adjustment and increases the reliability of adjustment. This can be achieved in a particularly simple fashion if the rollers or carriages are guided along rails. The shelves may also roll along the loading floor of the loading space by means of rollers. Since the shelves are preferably adjusted, in particular moved, in directions standing perpendicular to each other, castor elements may also be provided on the undersides of the shelves which offer no significant resistance on a direction change, as may be the case for rollers due to any necessary rotation of the rollers.

In order for the adjustment of the shelves to take place in a targeted and predefined fashion, the adjustment device may comprise a transport device for transporting the shelves from one storage position to another storage position, and from one storage position to the extraction position. The transport device then for example always transports the shelves in one step in a direction suitable for adjusting a shelf into the at least one extraction position. The transport device need not transport each shelf individually. The transport device may also adjust a row of shelves together. Thus for example one shelf may be moved via the transport device in one direction, together with the shelves which—viewed in this direction—adjoin the transported shelf. These are then shunted by the shelf actually transported, in particular shunted in front of the shelf actually transported. In the case of a guide device, certain shelves are preferably transported along the guide device.

The transport device should allow the adjustment of specific shelves independently of other shelves, and be configured simply and compactly. This is possible if the transport device grips by form fit at least one shelf to be adjusted. For this, the transport device may have at least one arm which is driven by a drive. The drive of the transport device may comprise at least one linear drive, in particular several. These are simple and allow a defined movement. Different movements may therefore be achieved by different drives, in particular linear drives.

The shelves are preferably adjusted in a predefined fashion which may depend on which shelf contains the next consignment to be delivered. The adjustment, in particular the movement, of the shelves by means of the adjustment device is therefore preferably controlled by a control device. The control device here preferably controls both the adjustment of the shelf with the next consignment to be extracted to the extraction position, and the adjustment of the other shelves which must be moved, in any case as far as necessary, in order to allow adjustment of the shelf with the next consignment to be extracted into the extraction position. To control the adjustment of the shelves, it is suitable if the control device has suitable information on which consignments are received in which shelves, and in which position the shelves assigned to the consignments are situated in the shelf system, in order to move the correct shelf into the extraction position. The information on the arrangement of the shelves in the shelf system may be detected as required via at least one provided sensor. The sensor may for example be an optical sensor and/or detect various codes, such as barcodes, on the shelves. This may however also be omitted if the control device can be notified, via sensors or otherwise, of the position of the individual shelves in the shelf system at least in a starting position. This may for example take place before starting the delivery round and after loading the delivery vehicle with consignments. When the shelves are then adjusted, in particular in the fashion predefined by the control device, the control device may determine from the movements of the shelves, starting from the position of the shelves in the starting position, where the individual shelves are presently situated in the shelf system.

The handling of the shelf system is simpler if the shelves each have several segments for receiving consignments. For the sake of simplicity, these segments may be arranged above each other in the sense of shelf bases. In principle, in this context it is preferred if the shelves are loaded on the various segments which are to be delivered to the same site along the delivery route or to sites approached successively along the delivery route. This avoids the unnecessary adjustment of the shelves. To ensure that the consignments do not accidentally slip off the shelves or segments, the consignments may for example easily but effectively be held by form fit in the segments. In order to simplify the handling of the consignments, in particular in the case where the consignments have very different forms and/or sizes, the shelves may comprise carrier elements for receiving the consignments. It is particularly simple if the carrier elements are configured as boxes. Then the consignments may be held for example by form fit in the carrier element, and the carrier element may be held for example by form fit in the shelf. The size and shape of the consignments plays no role here, as long as the consignments can be received by the carrier elements, for which reason the carrier elements should not be selected too small. By the use of carrier elements, these can be extracted from the shelves together with the consignments in defined ways, preferably always the same way, in particular irrespective of the nature and size of the consignments. This handling of the consignments is then independent of the nature or form of the consignments, and hence simple and reliable to achieve. A further simplification may be achieved if the consignments are delivered or output in the carrier elements. This too is then possible substantially independently of the nature and form of consignments, and hence very reliably. Thus in particular, a reliable, autonomous delivery or hand-over of consignments is ensured without human intervention. The use of carrier elements for example allows a simple loading of the shelves with good utilisation of the space available. If for example a very tall consignment is to be received, a necessary number of carrier elements above this may be omitted so that the consignment can be received in the shelf system. After delivery of the consignment, if necessary again several carrier elements with smaller consignments may again be arranged above each other at the corresponding position in the shelving system. In this context, the term "dynamic packing of the shelves" could be applied.

The extraction and as necessary the output or delivery of consignments may also be simplified if a corresponding extraction device is provided for extraction of a consignment, in particular a carrier element, from the shelf present in the extraction position. This again requires no human intervention and may thus also be used for autonomous extraction of consignments from the shelves. In order to be able to extract consignments from different segments of the shelves easily, in particular the use of an extraction device comprising a robot arm is suitable. As well as simply extracting the consignments, the extraction device may also be used for hand-over, delivery and/or presentation of consignments outside the delivery vehicle. This again promotes an autonomous operation of the delivery vehicle. In this context too, reliability is increased if the extraction device does not handle the consignment directly, but handles the carrier element holding the consignment. Alternatively or additionally, also consignments may be received or collected in the delivery vehicle along the delivery route. For the sake of simplicity, these consignments may be picked up by the extraction device and moved into the delivery vehicle. Preferably, the consignment is placed on the shelf present in the extraction position. For said reasons, this preferably takes place in conjunction with a carrier element which carries the corresponding consignment. It is also conceivable that an empty carrier element without consignment is received and placed on a shelf, such as in exchange for a carrier element which is delivered or handed over together with a consignment. Thus the carrier elements do not accumulate along the delivery route.

Accidental adjustment of the shelves in the shelf system can easily be prevented if a locking device is assigned at least to individual shelves for locking the respective shelves in a storage position. As required, a locking device may also be assigned to a shelf in the at least one extraction position. This is useful for example if a shelf is arranged in the at least one extraction position while the delivery vehicle is in motion. To ensure that all shelves are reliably locked during travel of the delivery vehicle, so there is no need to rely on individual shelves being held by other locked shelves, it is suitable if a locking device is assigned to all shelves. The shelves may for example be locked on the adjustment device and/or the guide device. Alternatively or additionally, the shelves may also be locked on the loading floor of the loading space. For this, the loading floor may have corresponding depressions or protrusions. The shelves may however also be pressed by friction against the loading floors without such aids. This may be achieved by wedging the shelves between the loading floor and the adjustment device, in particular the guide device. To secure the shelves against accidental movement in the forward and backward direction, it is suitable that at least an end shelf in these two directions is locked. Shelves arranged between these end shelves may then in some cases be adequately secured via the locking of the end shelves. Alternatively or additionally, it is preferred if the shelves are secured or locked against accidental movement in the forward and backward directions, both longitudinally and also transversely to the delivery vehicle, for example in the manner described above. The number of end shelves to be locked depends in some cases also on the configuration of the guide device. No locking is required in a direction in which a shelf cannot move because of the guide device. Therefore it is not necessary to lock the end shelves of each row of shelves, in particular if movement of the shelves in the direction of the corresponding row is already prevented for other reasons. It is however in no way necessary, and under certain circumstances also not desirable, for the shelves to be locked during travel of the delivery vehicle. Namely in order to save time, it may be preferred for the adjustment of the shelves to take place at least partially during travel. This is achieved for example if the shelf with the next consignment to be extracted can be adjusted into the at least one extraction position, or at least close to the extraction position, during travel of the delivery vehicle.

The loading of the delivery vehicle with consignments which are to be delivered or handed over along the delivery route may be accelerated if the shelves may already be provided with the consignments outside the delivery vehicle, in particular in a distribution centre, a store, in particular a warehouse or similar. This may take place before arrival of the delivery vehicle, further accelerating loading. The delivery vehicle may then receive the shelves with consignments very quickly. This is possible much more quickly than if the consignments had to be loaded individually by hand. In order for the shelves to be able to be received easily and quickly into the shelf system, the shelf system comprises at least one receiving device for receiving shelves, in particular complete with consignments. For example, there may be a particular region of the adjustment device or guide device via which shelves can be received in a targeted fashion. In some cases, there may also be an opening in a rail, or a rail portion which can be opened, so that the shelves can be introduced for example into the rail or mounted onto the rail. In order for the shelves of the preceding delivery route to be able to be replaced easily by shelves for the next delivery route, the shelf system may have an output device. In this way, consignments can also be unloaded which were unable to be delivered or were not handed over. Alternatively or additionally however, consignments could also be unloaded which were received i.e. picked up on the delivery route and placed in the shelves, and which are to be delivered at another site. The output device may then also be configured like the receiving device, or as explained as an example above for the receiving device. It is particularly simple structurally if the receiving device and the output device are one and the same device. Then under certain circumstances, simultaneous output and reception of shelves may not be possible independently of each other. This may however if required also be achieved if the shelf system is equipped with at least two different receiving/output devices.

In a first particularly preferred embodiment of the method, at least some shelves are adjusted by means of the adjustment device successively in different directions, wherein the adjustment preferably takes place in stages. Thus the shelf with the next consignment to be extracted may be brought, i.e. adjusted or moved, into the extraction position first of all, or in any case particularly easily and quickly. Also, adjustment of the shelves in different directions allows suitable use of shelf systems with a high number of storage positions and/or with many rows of shelves or storage positions. It is simple and suitable for utilisation of the loading space if the shelves are adjusted, in particular moved, by means of the adjustment device both longitudinally and transversely to the delivery vehicle.

The adjustment, in particular the movement, of the at least one shelf in the shelf system may preferably take place so that at least one storage position is cleared which was previously occupied or filled by the shelf. Thus space may be created for the movement of at least one shelf in the desired direction, namely in particular in the direction of the cleared storage position. The shelf which reaches the previously cleared storage position may preferably be the shelf with the next consignment to be extracted. This need not however be the case, for example, if the shelf holding the next consignment to be extracted is moved together with the shelf occupying the free storage position, or if the movement of shelves other than the shelf with the consignment to be extracted creates space for a subsequent movement of the shelf with the next consignment to be extracted. Since the space available for movement of the shelves is in any case limited, it is particularly preferred if the adjustment takes place in stages and storage positions are cleared in stages, and at the same time previously cleared storage positions are occupied again. Depending on the locations in the shelf system from and to which the shelf with the next consignment to be extracted should be moved, the adjustment steps of the shelves described above are carried out repeatedly in succession, in order to adjust the desired shelf step by step into the at least one extraction position or, if required, into a storage position from which the shelf can then be adjusted directly into the desired extraction position.

In order for the stepped adjustment of the shelves to take place in a targeted fashion, so that the cycle times for adjusting a specific shelf into the extraction position can be reduced, a control device should be used. The control device may thus determine, depending at least on the arrangement of the shelf with the next consignment to be extracted, but in particular also on the arrangement of all shelves in the shelf system, a suitable sequence of the stepped adjustment of shelves for adjustment of the shelf containing the next consignment to be extracted into the extraction position. Usually, there are a plurality or even a multiplicity of different sequences of movement steps which lead to the adjustment of a specific shelf into a specific extraction position. It is not necessarily known in advance which of these sequences is particularly short or comprises very many adjustment steps which are particularly simple and/or quick to perform. The control device may thus, for example, determine a suitable sequence of movement steps based on specific heuristics or rules. The control device may however also theoretically run through some of the possible sequences and compare these in order to propose a particularly short or particularly rapid sequence of movement steps. The control device then preferably predefines the sequence of movement steps established as preferable. Thus the adjustment by the adjustment device takes place as specified by the control device.

In order for the loading of the delivery vehicle to take place very rapidly, and loading of the shelves to take place before arrival of the delivery vehicle at the site at which the consignments to be delivered are prepared, i.e. a distribution centre, a warehouse or similar, the shelves equipped with the consignments may be received into the shelf system of the delivery vehicle, i.e. collected by the delivery vehicle, before driving the delivery route. Alternatively or additionally, shelves of the shelf system may be output before driving the delivery route, i.e. for example at the distribution centre or warehouse. This creates space if necessary in order to receive shelves already loaded with consignments. In this way however, consignments received during driving of the delivery route, for delivery elsewhere, can be output easily and quickly. The corresponding consignments are transported on according to destination and, if necessary for the purposes of delivery, again placed on a shelf of a shelf system of a corresponding delivery vehicle.

The extraction of consignments may be simplified and/or accelerated if an extraction device is used for this. This also allows for example the autonomous delivery or hand-over of consignments. For the sake of simplicity and to provide different movements, it is suitable if the extraction device is equipped with a robot arm. The robot arm may then extract a consignment from the shelf arranged in the associated extraction position. To ensure that the nature, size and/or shape of the consignment need not be taken into account for the extraction of consignments from the shelf, the extraction device, in particular the robot arm, may extract a carrier element carrying the consignment from the shelf arranged in the extraction position. The carrier elements of the shelves here preferably have uniform and/or standardized sizes, which simplifies the handling of the carrier elements. Here for example so-called Euro-boxes could be used which for example are available in sizes 40×30×9 cm up to 80×60×44 cm, and optionally may have open or closed handles, lids and/or label clips. The carrier elements may also in principle be configured so as to be rectangular. However, carrier elements with a square or a different cross-section form are also conceivable. Alternatively or additionally, the extraction device may pick up a consignment from the outside relative to the delivery vehicle, and place it on the shelf arranged at the extraction position. This too may be simplified if the consignment is carried by a carrier element. The extraction device may thus if necessary also receive consignments, which makes an additional consignment pick-up device unnecessary. If this is desired however, where necessary a consignment pick-up device may also be provided. The consignments may in principle be presented in various ways outside the delivery vehicle. If required, the consignments or the carrier elements may be handed over manually, i.e. by hand. The consignments or carrier elements may however also be extracted from shelves provided outside the delivery vehicle, which preferably resemble the shelves of the shelving system. The consignments may however also be prepared in special consignment cases, such as mail boxes or parcel boxes, and extracted therefrom as required by means of the extraction device.

BRIEF DESCRIPTION OF THE SEVERAL VIEWS OF THE DRAWING

The invention is described in more detail below with reference to a drawing showing merely an exemplary embodiment. The drawing shows:

FIG. 2A-G show adjustment steps for adjustment of shelves in the delivery vehicle of FIG. 1 in a diagrammatic top view;

DETAILED DESCRIPTION OF THE INVENTION

Figure 1:
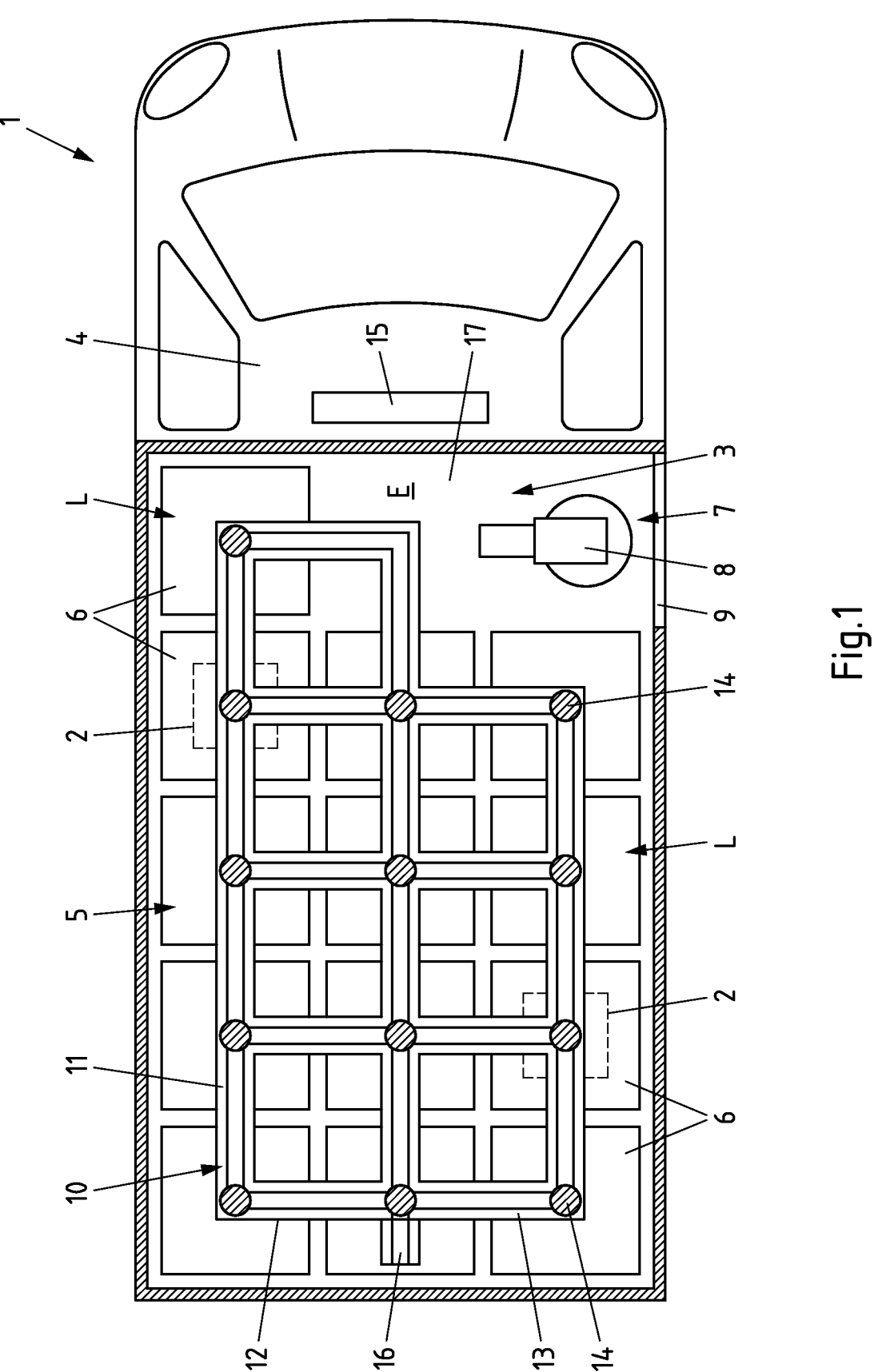
FIG. 1 shows a first delivery vehicle according to the invention in a diagrammatic top view.

FIG. 1 shows a delivery vehicle 1 for delivering or presenting consignments 2, with a loading space 3 and a driver's cab 4. A driver is not however essential. The delivery vehicle 1 may also be configured for autonomously driving a delivery route. The driver's cab 4 then serves merely for guidance of the delivery vehicle 1 by a driver in exceptional situations, such as in the case of a fault or a particular traffic situation.

A shelf system 5 with several shelves 6 is provided in the loading space 3, the shelves 6 are each arranged in a storage position L. Also, the shelf system 5 provides an extraction position E in which however no shelf 6 is provided. A consignment 2 may be extracted from the shelf 6 in the extraction position E, for which an extraction device 7 with a robot arm 8 is provided. The robot arm 8 is configured so that it can reach into the respective shelf 6 at various heights, in order to be able to extract consignments 2 provided at different heights on the shelves 6. The consignments 2 can also be moved by the robot arm 8 through a closable opening 9 of the loading space 3 towards the outside relative to the delivery vehicle 1, and there unloaded, handed over or delivered. This may in principle take place in various ways, but in the present case is not depicted.

The shelves 6 are provided so as to be adjustable in the shelf system 5 via an adjustment device 10. The adjustment device 10 in particular comprises the components of the shelf system 5 which together allow the adjustment of the shelves 6, i.e. for example the components which are sufficient for adjusting the shelves. With the shelf system 5 depicted and thus preferred, and with the adjustment device 10 depicted and thus preferred, all shelves 6 can be moved in the longitudinal direction of the delivery vehicle 1 and transversely to the delivery vehicle 1, i.e. in two mutually perpendicular directions. For this, the adjustment device 10 shown and thus preferred has a guide device 11 comprising a rail system 12. The rail system 12 may have C-shaped rails 13 open at the bottom, in which guide elements 14 of the shelves 6 are guided. The guide elements 14 may be wider than the lower opening of the C-shaped rails 13. Thus the guide elements 14 are held in the rail system 12 in the manner of sliding blocks. The guide elements 14 of the shelf system 5 depicted and thus preferred are configured as discs or cylinders. In principle, the guide elements 14 could also have a rectangular or square cross-section in a plane defined by the guide device 14. In order for adjustment to be possible without great force being required, the guide elements 14 of the shelves 6 may be guided via rollers in the rails 13. The guide elements 14 are here dimensioned such that the shelf 6 can be adjusted both along the rails 13 of the guide device 11 oriented in the longitudinal direction of the delivery vehicle 1, and along the rails 13 oriented transversely to the delivery vehicle 1. The adjustment of the shelves 6 is controlled via the control device 15 integrated in the delivery vehicle 1.

Also, at the rear end of the guide device 11, a receiving/output device 16 is provided for receiving shelves 6, in particular carrying consignments 2, and/or for output of shelves 6, where applicable carrying consignments 2, of the shelf system 5. The receiving/output device 16 and hence the guide device 11 may be opened in order to receive guide elements 14 of shelves 6 in the rails 13, or to extract these from the rails 13. The receiving/output device 16 may also be closed to prevent accidental slippage of the shelves 6 out of the shelf system 5 via the receiving/output device 16, or catching of the shelves 6 of the shelf system 5 in the receiving/output device 16.

In the delivery vehicle 1 depicted and hence preferred, the loading floor 17 of the loading space 3 holds a transport device with several drives which cause the movement of the shelves 6 in the shelf system 5. The transport device is not shown in the diagrammatic top view of FIG. 1. In principle however, a transport device could also be provided above the shelves 6, which for example could be connected to the adjustment device 10 or the guide device 11. A further option would be to couple the transport device to the shelves 6, so that the shelves 6 have separate drives which could trigger the travel of the shelves 6 for example on the loading floor 17 or the guide device 11.

Figure 2A:
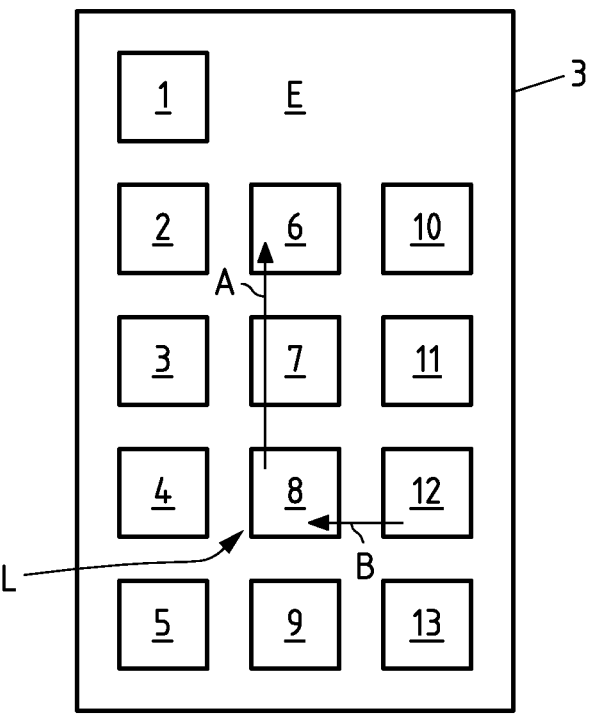
Figure 2B:
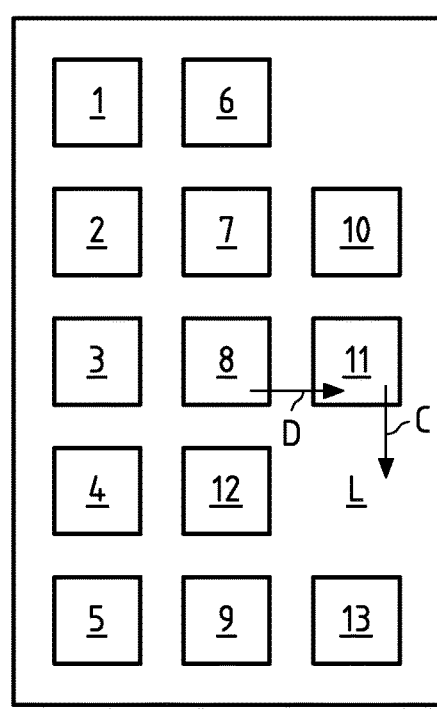
Figure 2C:
Figure 2D:
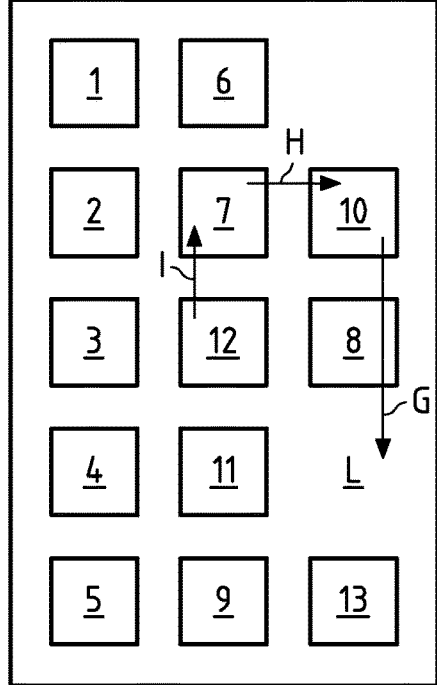
Figure 2E:
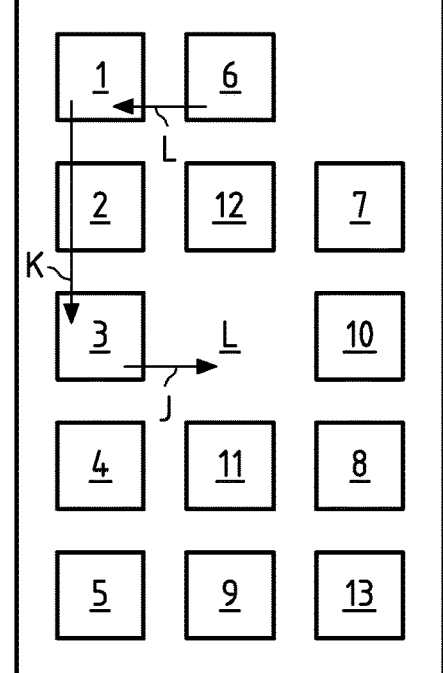

FIGS. 2A-G show the loading space 3 of the delivery vehicle 1 from FIG. 1 with the shelves 6 of the shelf system 5, numbered from 1 to 12, in a highly diagrammatic view, in different positions in a sequence of adjustment steps for adjusting shelf no. 12 into the extraction position E. FIG. 2A shows the shelves 6 in a starting position. In a first adjustment step along arrow A, shelves nos. 6-8 are moved forward in the direction of the extraction position E. This clears the storage position L on the left next to shelf no. 12, which in the adjustment step identified by arrow B is moved to the left into the free storage position L, so that a free storage position L is created at the original position of shelf no. 12. According to the depiction in FIG. 2B, shelf no. 11 is moved along arrow C into the now empty storage position L, and shelf no. 8 is moved along arrow D into the now clear storage position L at the former position of shelf no. 11. Now as shown in FIG. 2C, shelf no. 12 can be moved along arrow E by a further step forward in the direction of the extraction position E. In order to create a further empty position in the form of an unoccupied storage position L between shelf no. 12 and the extraction position E, shelf no. 11 is now moved along arrow F to the left into the former position of shelf no. 12. Following the depiction in FIG. 2D, shelves nos. 8 and 10 are now moved back along arrow G, whereby a free storage position L is created at the front end of the right-hand row of storage positions L, oriented in the longitudinal direction of the delivery vehicle 1. This free storage position L is filled by shelf no. 7 by movement to the right along arrow H. The resulting empty position L is now filled by movement of shelf no. 12 forward along arrow I in the direction of the extraction position E. Now as shown in FIG. 2E, in succession shelf no. 3 is moved to the right along arrow J, shelves nos. 1 and 6 are moved back along arrow K, and shelf no. 6 is moved to the left along arrow L so that, as shown in FIG. 2F, the extraction position E is clear for receiving shelf no. 12 along arrow M.

Then in the position shown in FIG. 2G, a consignment 2 provided on a segment of shelf no. 12 may be extracted by the extraction device from the shelf 6 and moved outward relative to the delivery vehicle 1. This takes place preferably autonomously, i.e. without human intervention. The consignment 2 can now be delivered or handed over at the specified site along the delivery route. There are various possibilities for this. One preferred possibility is the placing of the consignment 2 in a case provided for this, such as a mail box, a parcel box or a packing station. The consignment 2 may also be received by a person or be output by the extraction device 7 to a shelf 6 outside the delivery vehicle 1. The precise nature of the hand-over in this case plays only a secondary role and is not therefore described in detail.

The adjustment of shelf no. 12 described above into the extraction position E is relatively complex. Therefore a relatively complex adjustment device 5 is required, in particular a complex guide device 11. The guide device 11 depicted and thus preferred has a whole series of rails 11 which are all connected together. For this, an entire series of T-pieces and intersections is required. As well as the guide device 11, where applicable a very complex transport device is also required. This must namely ensure that each shelf 6 of the shelf system 5 may as required be moved individually in two, three or four directions, depending on the position of the shelf 6 in the shelf system 5. Two directions may for example be opposite to each other, such as on a straight rail piece, or run via a corner, such as in a corner of the guide device 11. In the guide device 11 shown and thus preferred, a shelf may be moved typically in three directions at a T-piece and typically in four directions at an intersection. The corresponding hardware complexity however allows a very flexible movement of the shelves 6 and/or the reception of a very great number of shelves 6 in the shelf system 5, which nonetheless can be adjusted very quickly into the at least one extraction position E. The shelves 6 may be adjusted at least almost optimally, since the shelf system 5 provides very many degrees of freedom for the adjustment of the shelves 6 in the shelf system 5.

Figure 3:
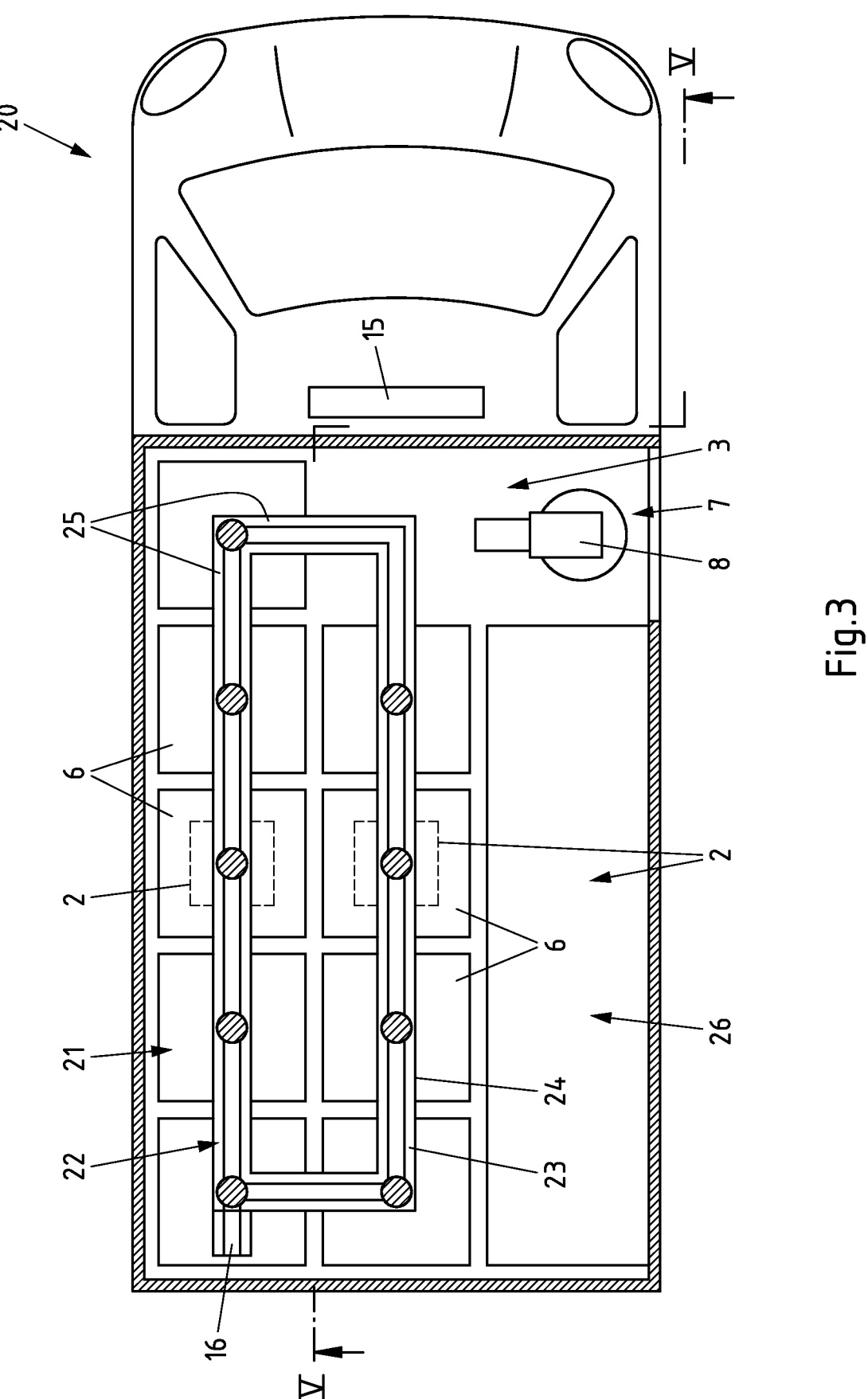
FIG. 3 shows a second delivery vehicle according to the invention in a diagrammatic top view.

The adjustment is simpler if the storage positions L are arranged in only two rows, as shown in the delivery vehicle 20 in FIG. 3, in particular in the case that the number of shelves 6 received in the shelf system 21 is equal to the number of storage positions L available. Then the shelves 6 may be moved in a circle or along a rectangle until the desired shelf 6 arrives at the extraction position E.

Figures 4A, 4B:
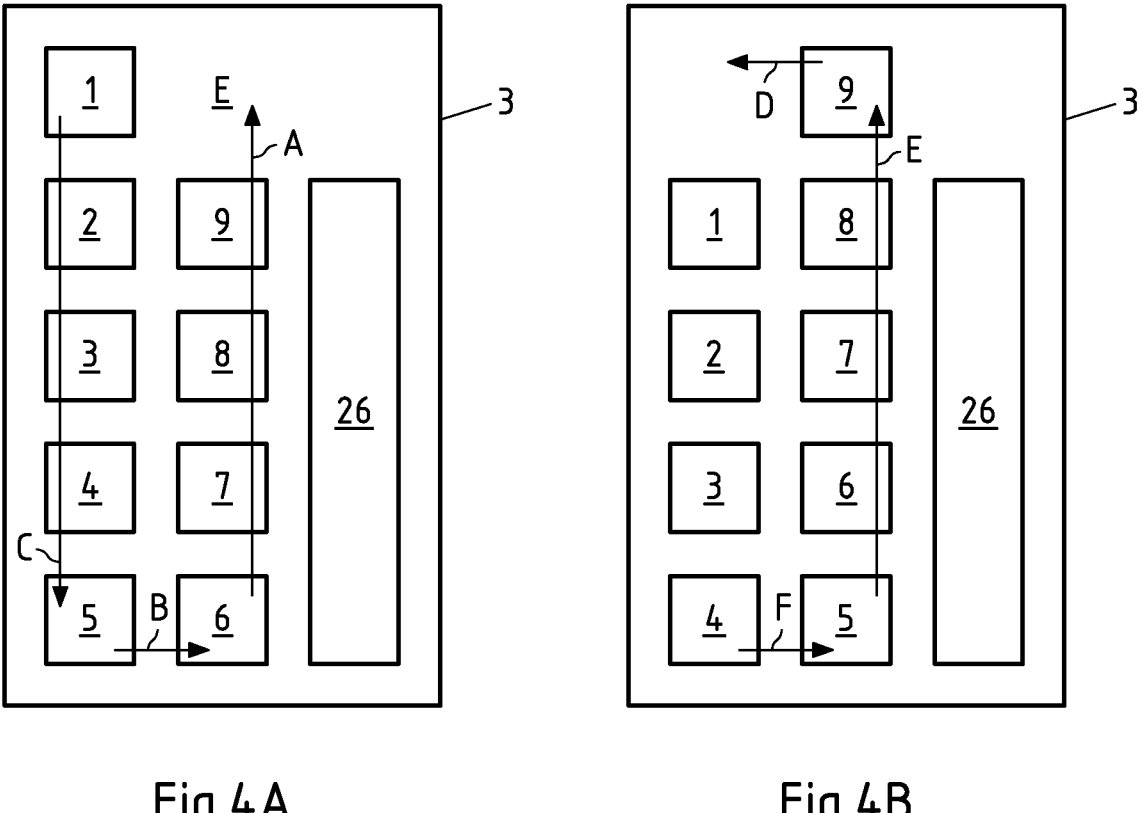
FIG. 4A-B show adjustment steps for adjustment of shelves in the delivery vehicle of FIG. 3 in a diagrammatic top view.

The correspondingly stepped adjustment of the shelves numbered 1 to 9 is indicated by the arrows A-C depicted in FIG. 4A. With these adjustment steps, the shelves 6 reach the positions shown in FIG. 4B. Now the adjustment steps may take place as depicted by arrows D-F. Then, again, an adjustment step takes place according to arrow C from FIG. 3A. The adjustment steps are carried out successively until the desired shelf 6 is provided in the extraction position E. The shelves 6 are moved in succession past the extraction position E.

Since the adjustment of the shelves 6 is easier, and the shelves 6 are guided for adjustment on a closed circuit which need not necessarily be circular, only a simpler adjustment device 22 and a simpler guide device 23 are required. The rail system 24, shown in FIG. 3 and hence preferred, of the guide device 23 is achieved without any T-pieces and intersections. Accordingly, significantly fewer transverse rails 25 are necessary for connecting the rails 25 extending in the longitudinal direction. The guide device 23 has only two rails 25 extending in the longitudinal direction, and two rails 25 connecting these two rails 25 together transversely at the two longitudinal ends. With the delivery vehicle 20 shown in FIG. 3, the loading space 3 is only partially filled by the shelf system 21. This could for example easily be modified by the use of wider shelves 6 while retaining the adjustment device 22 in principle. With the shelf system 21 depicted and hence preferred, instead, as well as the shelf system 21, further storage space 26 is created for consignments 2 which, for example, cannot be received efficiently in the shelves 6 because the consignments 2 are for example very large and/or very small. With the delivery vehicle depicted and hence preferred, in particular mail consignments are stored in the additional storage space 26. This is however not necessarily the case.

Figure 5:
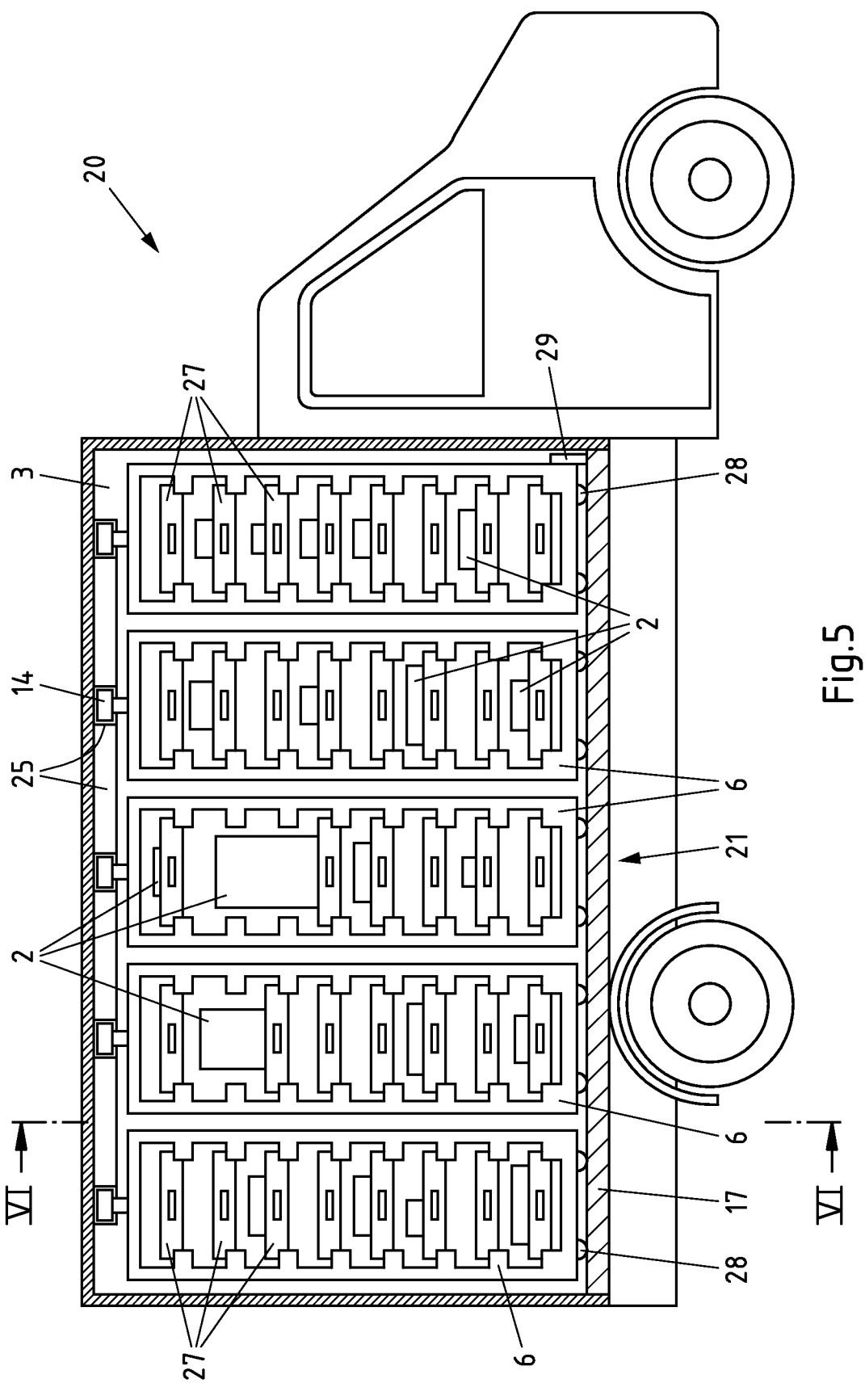
FIG. 5 shows the delivery vehicle of FIG. 3 in a section view along the section plane V-V from FIG. 3.
Figure 6:
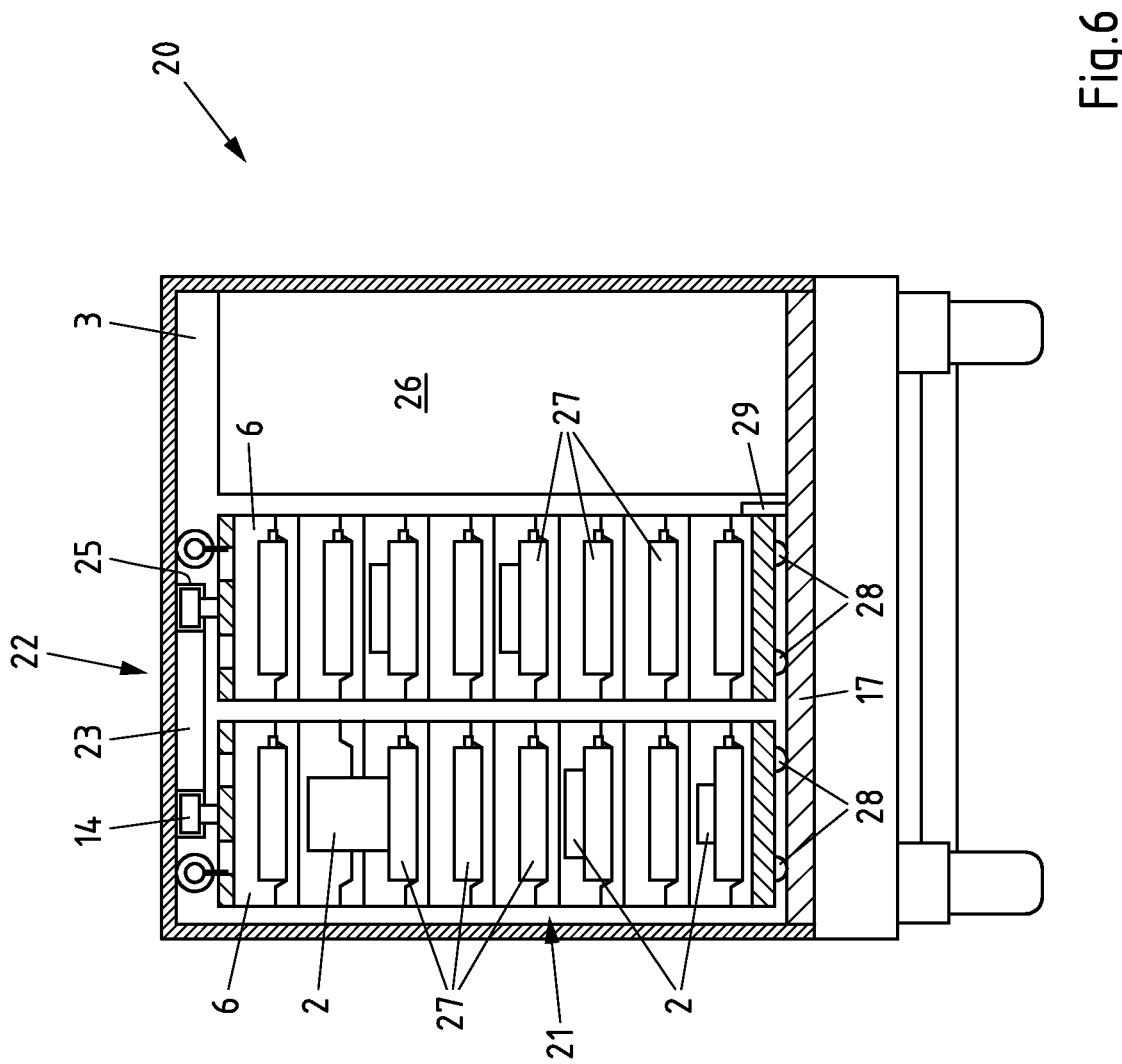
FIG. 6 shows the delivery vehicle of FIG. 3 in a section view along section plane VI-VI of FIG. 5.

FIG. 5 shows the delivery vehicle 20 according to FIG. 3 in a section view along a section plane in the longitudinal direction of the delivery vehicle 20, and FIG. 6 shows a section view from behind along a section plane transversely to the delivery vehicle 20. The shelves 6 of the shelf system 21 depicted and hence preferred have different segments over their height, in the sense of shelf bases, wherein carrier elements 27 are received in the segments. Due to the form-fit connection, the carrier elements 27 are held on the shelf 6 at the corresponding height and in the longitudinal and transverse direction of the delivery vehicle 20. At individual places on the shelf 6, carrier elements 27 may be omitted in order to provide a higher consignment 2 on the carrier elements 27 located below. When the shelf 6 is in the extraction position, the carrier elements 27 may easily be lifted by the extraction device 7, in particular by means of a robot arm 8 inserted underneath, and extracted from the shelf 6. The carrier element 27 together with the consignment 2 is then output to the outside in order to deliver the consignment 2. The carrier element 27 is left behind if required or, after delivery of the consignment 2, returned to the shelf 6. Carrier elements 27 provided with consignments 2 and presented outside the delivery vehicle 20 may also be transferred to the delivery vehicle 20 by means of the extraction device 7 and introduced into the shelves 6.

The shelves 6 depicted in FIGS. 5 and 6 have rotatable castors or rollers 28 at the lower end, with which the shelves 6 can be moved over the loading floor 17 in the longitudinal direction and in the transverse direction relative to the delivery vehicle 20. The shelves 6 in the shelf system 21 depicted and hence preferred are driven by a transport device which may be provided in the loading floor 17. In FIGS. 5 and 6, only the arms 29 of the transport device are shown, which are arranged above the loading floor 17 and can engage by form fit on the adjacent shelves 6 and move these.

Figures 7A, 7B:
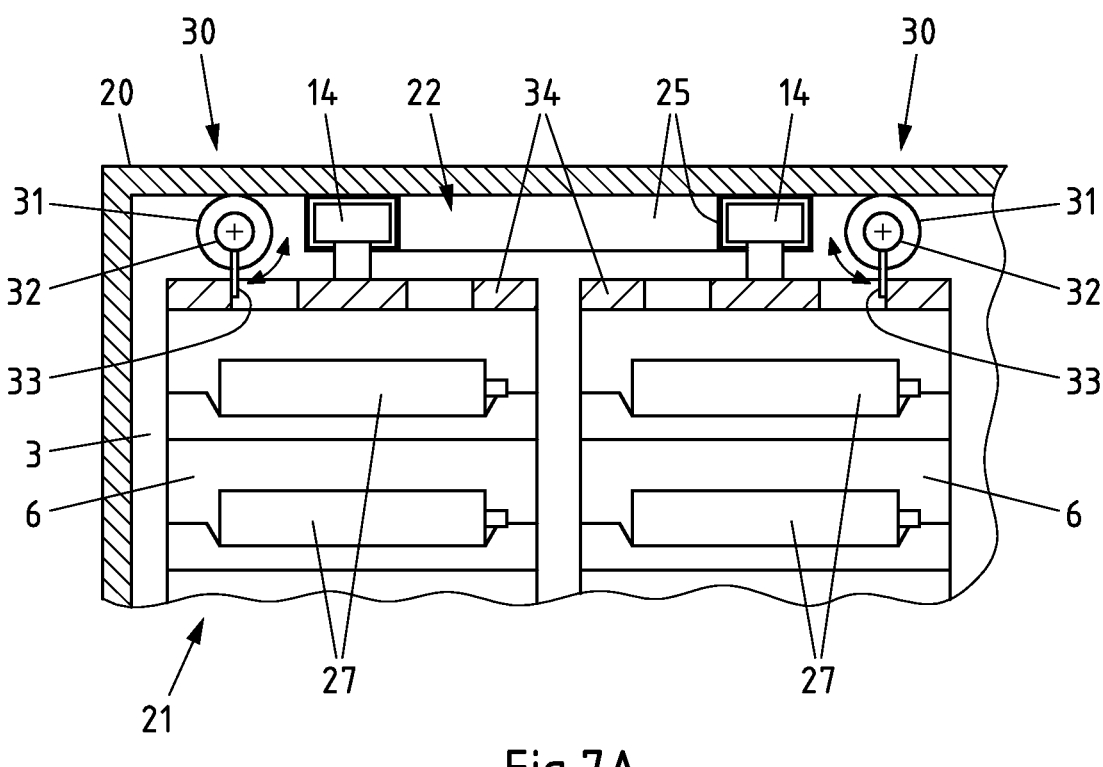
FIG. 7A-B shows a detail depiction of FIG. 6 in a section view transversely and longitudinally to the delivery vehicle from FIG. 3.

FIGS. 7A-B show a further detail of the shelf system 21 according to FIG. 6: in FIG. 7A in a view from behind and in FIG. 7B in a side view. FIG. 7A depicts some of the rails 25 of the guide device 23 in a cross-section. The rails 25 have a C-shaped profile open towards the bottom, in which the guide elements 14 of the shelves 6 are held. The guide elements 14 are wider than the bottom opening of the C-shaped rails 25. The guide elements 14 may if required be guided via rollers in the C-shaped rails 25, wherein the rollers are provided on the guide elements 14 and can roll along running faces of the C-shaped rails 25.

The shelf system 21 also has a locking device 30 assigned to the guide device 23 for locking the shelves 6 in the shelf system 21, for example during travel of the delivery vehicle 20. The locking device 30 here comprises shafts 32 which are driven by a drive 31 and on which a row of radially protruding finger elements 33 is arranged. Via the drive 31, the shafts 32 may be rotated about their longitudinal axes, wherein the finger elements 33 may be swivelled from a locking position facing downward into a release position facing the side, and back again. In the release position, the finger elements 33 of the locking device 30 do not obstruct the adjustment of the shelves 6. In the locking position, the finger elements 33 however engage by form fit in a frame 34 of the shelf 6 arranged underneath. The finger elements 33 of the locking device 30 and the frames 34 of the shelves 6 then form an interference connection which holds the shelves 6 in position. Other locking devices are however conceivable. Thus for example, instead of finger elements 33, cam elements may be provided which do not swivel like the finger elements but can be moved up and down via a gear wheel or toothed rod following a rotation of the shaft 32. In the lower position, the cam elements may engage by friction on the shelf 6 provided underneath, and/or by interference in the shelf 6 provided underneath or in a corresponding frame of the shelf. Locking devices in the form of a locking plate are also possible, which can be lowered as a whole and then engages by form fit in the frames of the shelves 6 of the shelf system 21. In principle, a force-fit and/or a form-fit locking of at least individual shelves 6 is possible.

Figure 8:
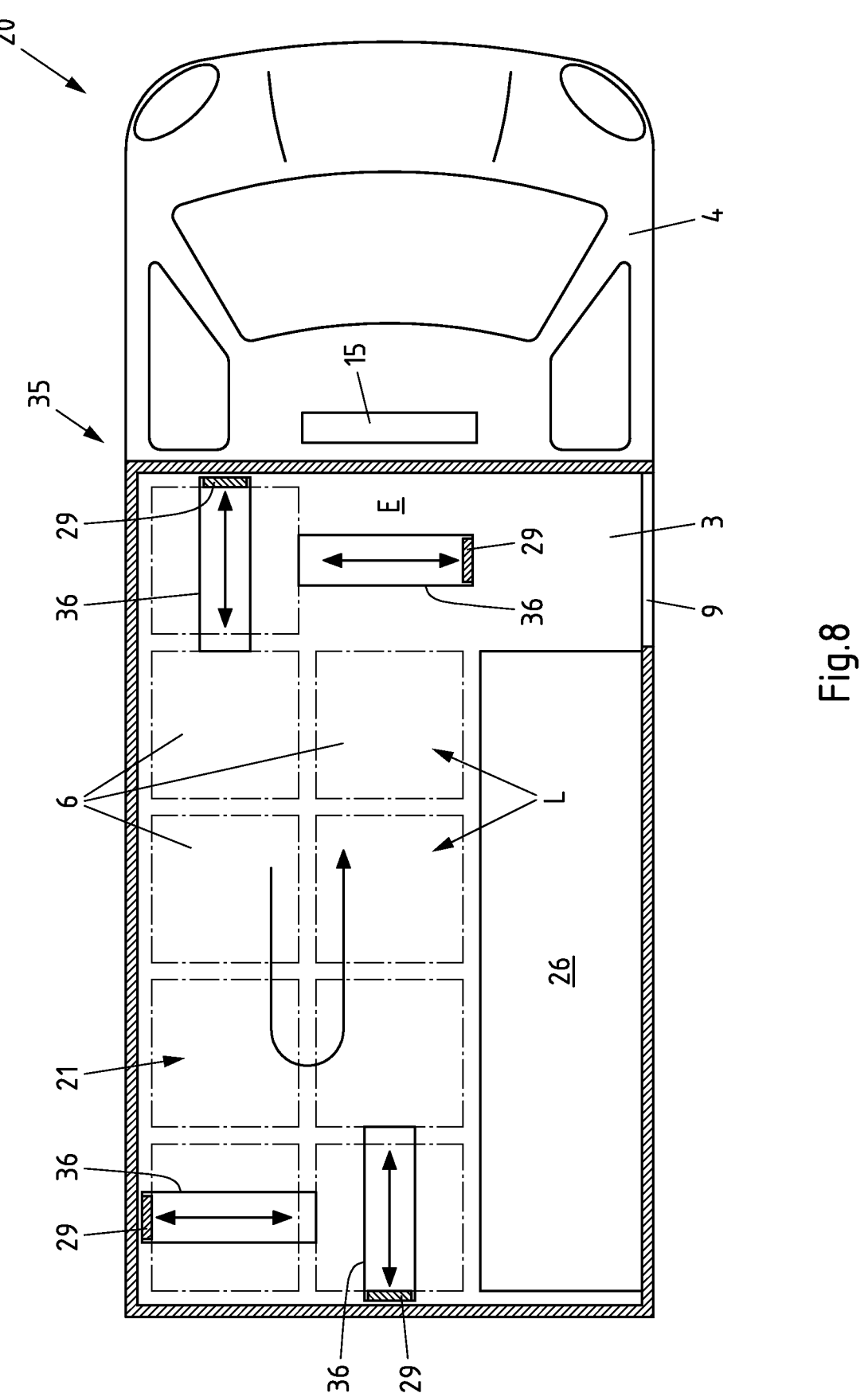
FIG. 8 shows a detail depiction of the delivery vehicle from FIG. 3 in a diagrammatic top view onto the loading floor.

FIG. 8 shows the transport device 35 of the delivery vehicle 20 according to FIG. 3 for adjusting the shelves 6 of the shelf system 21 along the guide device 23. With this delivery vehicle 20, the shelves 6 are adjusted only along a closed rectangular track counterclockwise, as indicated by the arrow. Also, with the shelf system 21 depicted and hence preferred, only one storage position L or the one extraction position E is unoccupied at a time. At the left rear, a drive unit 36 is provided which has a drive and a laterally adjustable arm 29 for laterally gripping a shelf 6. The drive unit 36 may move the corresponding shelf 6 out of the storage position L at the left rear into the storage position L at the right rear. At the right rear, a drive unit 36 is provided which has an arm 29 adjustable in the longitudinal direction, in order to move a shelf 6 out of the rear right storage position L into the storage position L in front. The shelves 6 arranged in front of the shelf 6 are moved forward with this, also by one storage position L. Here, the adjacent shelves 6 of the shelf system 21 depicted and hence preferred adjoin each other at least substantially, so that several shelves 6 can easily be moved together via a single drive unit 36. The transport unit 36 at the left front again serves to move a shelf 6 provided there to the left by one position, wherein the transport unit 36 has an arm which is arranged on the right and comes into contact with a shelf 6. The drive unit 36 at the front left, which to this end can also grip the shelf 6 at the front left with an arm 29, serves to adjust the shelves 6 of the left-hand row of shelves 6 in the longitudinal direction of the delivery vehicle 20 by around one shelf width. The further shelves 6 arranged in the left-hand row of shelves 6 are moved with said shelf 6 towards the rear, for which reason the shelves 6 adjoin each other at least substantially at least in this direction.

With the shelf system 5 according to FIG. 1, and to implement the adjustment steps according to FIG. 2A-G however, significantly more drive units 36 of the type described are required, which then cannot be arranged merely in the corners of the shelf system 5. In principle however, here again there are various possibilities for configuration of the drive device 35.

Figure 9:
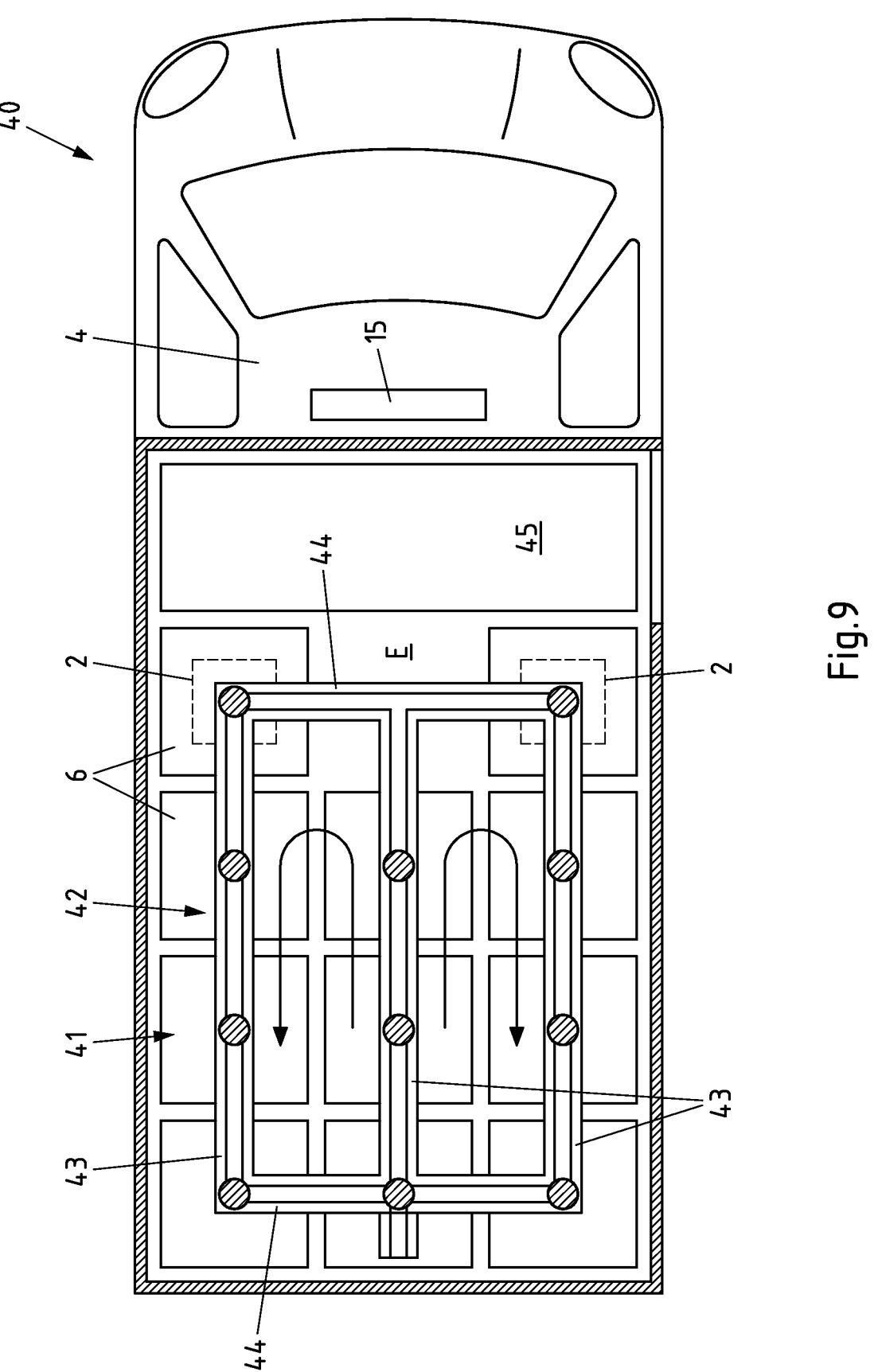
FIG. 9 shows a third delivery vehicle according to the invention in a diagrammatic top view.

FIG. 9 shows a delivery vehicle 40 with a shelf system 41 which is a compromise between the shelf systems 5, 21 of the delivery vehicles 1, 20 according to FIGS. 1 and 3. The shelf system 41 has a guide device 42 with three parallel rails 43 in the longitudinal direction. The longitudinal ends of the rails 43 are connected by rails 44 running transversely to the delivery vehicle 40. The guide device 42 thus forms two parallel closed circuits, which again need not be configured so as to be circular, but in the present case are configured so as to be rectangular. Depending on which shelf 6 is to be moved into the extraction position E, either the shelves 6 of the left-hand circuit are moved along the circuit, or the shelves 6 of the right-hand circuit are moved along the right-hand circuit, as indicated by the arrows. This takes place until the desired shelf 6 is arranged in the extraction position E. The extraction device 45 is here arranged in front of the shelf system 41, but this need not necessarily be the case. The extraction device 45 may also have a robot arm 8 to extract the carrier elements 27 of the shelves 6 from the shelves 6.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A delivery vehicle for delivery of consignments to different sites along a delivery route, with a loading space comprising a shelf system for shelves holding consignments, characterized in that the shelf system is configured to receive shelves in a plurality of storage positions for provision of the shelves and in at least one extraction position for extraction of consignments from the shelves, and that the shelf system has at least one adjustment device for adjusting the shelves of the shelf system between several storage positions and the at least one extraction position;

wherein the shelf system has a grid with an empty space without a shelf in the manner of a shifting puzzle and according to which a shelf of the shelf system adjacent to the empty space is provided so as to be displaceable in a longitudinal direction or in a transverse direction with respect to the grid onto the empty space;

wherein the at least one adjustment device is configured to adjust at least one of the shelves, the adjustment device has a guide device comprising a rail system arranged above the shelves for guiding the shelves in the shelf system between several storage positions and the extraction position, wherein rails of the guide device are connected to each other by a series of T-pieces and crossings and the shelves are moveable along individual ones of the rails in two, three or four directions depending on a position of the shelves at which the shelves are connected to the guiding device;

wherein the at least one adjustment device is configured to adjust the shelves in any storage position in the longitudinal direction and in the transverse direction along the rails of the rail system into any adjacent storage position in the shelf system;

wherein the shelves have castors or rollers to be moved in the longitudinal direction and in the traverse direction standing on the floor of the delivery vehicle; and wherein a locking device is assigned at least to individual shelves for locking the respective shelves in the storage position.

2. The delivery vehicle according to claim 1, wherein at least one of:

the storage positions of the shelf system are arranged in rows running parallel or perpendicular to each other, the number of shelves of the shelf system corresponds at most, preferably at least substantially, to the number of storage positions, or the shelves of the shelf system are configured at least substantially the same.

3. The delivery vehicle according to claim 1, characterized in that a control device is provided for controlling the adjustment device for adjusting the shelves relative to each other and preferably for adjusting the shelf with the next consignment to be extracted from a storage position to the extraction position.

4. The delivery vehicle according to claim 1, characterized in that the shelves have segments for receiving consignments and preferably that the shelves have carrier elements which are removable from the shelves, for receiving consignments.

5. The delivery vehicle according to claim 1, characterized in that an extraction device is provided, preferably comprising a robot arm, for extraction of a consignment from the shelf present in the extraction position, and preferably that the extraction device is provided for introduction of a consignment into the shelf present in the extraction position.

6. The delivery vehicle according to claim 1, characterized in that the locking device is assigned to individual shelves, preferably to each shelf, for locking the respective shelf in the storage position and preferably in the extraction position.

7. The delivery vehicle according to claim 1, wherein at least one of the shelf system has at least one receiving device for receiving shelves or an output device for output of shelves, preferably with consignments, of the shelf system.

8. The delivery vehicle according to claim 1, wherein the at least one delivery device is configured to adjust each shelf of the shelf system into each storage position and into the extraction position.

9. A method for delivery of consignments to different sites along a delivery route with a delivery vehicle according to claim 1, with a loading space comprising a shelf system with shelves for receiving consignments in a plurality of storage positions and at least one extraction position, the method comprising the steps of:

adjusting the shelf with the next consignment to be delivered via an adjustment device from a storage position into the extraction position, and adjusting other shelves of the shelf system such that the other shelves, for adjustment of the one shelf into the extraction position, clear at least one storage position and preferably the extraction position;

wherein the at least one adjustment device is configured to adjust the other shelves step by step one after the other in different directions in order to adjust the shelf with the next consignment to be delivered into the extraction position;

wherein the shelf system has a grid with an empty space without a shelf in the manner of a shifting puzzle and according to which a shelf of the shelf system adjacent to the empty space is provided so as to be displaceable in the longitudinal direction or in the transverse direction with respect to the grid onto the empty space;

wherein the at least one adjustment device is configured to adjust the shelves in any storage position in the longitudinal direction and in the transverse direction into any adjacent storage position in the shelf system.

10. The method according to claim 9, wherein in particular all shelves are adjusted by means of the adjustment device in stages successively in different directions, preferably along and transversely to the delivery vehicle, in order to adjust the respective shelf with the next consignment to be delivered into the extraction position.

11. The method according to claim 9, clearing at least one storage position by the adjustment of shelves, and adjusting at least one of the shelf with the next consignment to be extracted or another shelf into the at least one cleared storage position, and in which, preferably, the steps described above of clearing and occupying storage positions are carried out repeatedly.

12. The method according to claim 9, further comprising:

determining with a control device, depending on at least the arrangement of the shelf with the next consignment to be extracted, a suitable sequence of adjustment of shelves for adjusting the shelf containing the next consignment to be extracted into the extraction position, and wherein the adjustment of the shelves by the adjustment device takes place according to the sequence of adjustment of shelves determined by the control device.

13. The method according to claim 9, further comprising:

receiving, before driving the delivery route, shelves carrying consignments in the shelf system, and outputting shelves of the shelf system before driving the delivery route.

14. The method according to claim 9, extracting with an extraction device, preferably with a robot arm extracts a consignment from the shelf arranged in the extraction position and delivering the consignment towards the outside relative to the delivery vehicle, and wherein, preferably, the extraction device receives a consignment from the outside and transfers it to the shelf arranged in the extraction position.

* * * * *